United States Patent
Kuroki et al.

(10) Patent No.: US 7,452,181 B2
(45) Date of Patent: Nov. 18, 2008

(54) PLANT FACILITY

(75) Inventors: Hidetoshi Kuroki, Hitachi (JP); Shinya Marushima, Hitachinaka (JP); Ryo Akiyama, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 147 days.

(21) Appl. No.: 11/339,573

(22) Filed: Jan. 26, 2006

(65) Prior Publication Data

US 2006/0197345 A1    Sep. 7, 2006

(30) Foreign Application Priority Data

Jan. 28, 2005  (JP) .............................. 2005-021492

(51) Int. Cl.
*F01D 25/16*    (2006.01)
(52) U.S. Cl. ........................ 415/123; 290/52
(58) Field of Classification Search ................ 415/123, 415/229; 290/52
See application file for complete search history.

(56) References Cited

U.S. PATENT DOCUMENTS 7,021,062 B2 * 4/2006 Tanaka et al. ................. 60/773
2003/0127927 A1 * 7/2003 Razzell et al. ............. 310/90.5
2004/0012207 A1 * 1/2004 Nagy .......................... 290/55

FOREIGN PATENT DOCUMENTS

JP    2003-106171    4/2003

* cited by examiner

*Primary Examiner*—Edward Look
*Assistant Examiner*—Dwayne J White
(74) *Attorney, Agent, or Firm*—Mattingly, Stanger, Malur & Brundidge, P.C.

(57) ABSTRACT

A plant facility in which lubricant supply equipment for supplying a lubricant to rotor bearings and a speed reducer can be dispensed with. The plant facility comprises a gas turbine rotor of a gas turbine that serves as a prime mover driven by expansion work of a working fluid, a generator rotor of a power generator that serves as load equipment rotated by rotational power transmitted from the gas turbine rotor, a plurality of magnetic bearings for supporting the gas turbine rotor and the generator rotor, and an electromagnetic coupling for magnetically coupling the gas turbine rotor and the generator rotor and adjusting a speed reduction ratio between the gas turbine rotor and the generator rotor in accordance with supplied power.

4 Claims, 6 Drawing Sheets

PLANT FACILITY

BACKGROUND OF THE INVENTION

1. Field of the Invention

The present invention relates to a plant facility in which load equipment, such as a power generator, a pump or a gas compressor, is driven by a prime mover having a driving rotor, such as a turbine or an engine.

2. Description of the Related Art

In a power generation facility, for example, rotational power of a turbine rotor, i.e., a driving rotor provided in a gas turbine or a steam turbine, is generally transmitted to a generator rotor for generation of electric power. In the field of that related art, there is known an example in which a turbine rotor of a gas turbine is connected to a generator rotor through a speed reducer having a predetermined gear ratio (see, e.g., Patent Document 1: JP,A 2003-106171). In such a power generation facility using a turbine, the turbine rotor and the generator rotor each operating as a rotating component are supported by many slide bearings, and a lubricant has to be supplied to those slide bearings, etc. along with the speed reducer. Therefore, lubricant supply equipment is disposed which includes a lubricant tank for storing the lubricant, piping for connecting the lubricant tank and the slide bearings, and other auxiliaries.

SUMMARY OF THE INVENTION

With the above-mentioned related art, however, the provision of the lubricant supply equipment requires a larger equipment installation area as a whole and increases the equipment cost. In addition, the construction time for the facility is also prolonged because of the necessity of installing the lubricant supply equipment and routing the piping. Further, although the lubricant is supplied to lubricate frictional sliding portions of the slide bearings and tooth surfaces of the speed reducer for the purpose of reducing frictional losses, some frictional loss is inevitably caused between each sliding portion and a lubricant film.

In view of the above-mentioned problems with the related art, an object of the present invention is to provide a plant facility in which lubricant supply equipment for supplying a lubricant to rotor bearings and a speed reducer can be dispensed with.

To achieve the above object, the present invention is featured in that rotor bearings are all constituted as magnetic bearings and rotors are connected to each other through electromagnetic couplings.

According to the present invention, the lubricant supply equipment for supplying the lubricant to the rotor bearings and the speed reducer can be dispensed with. This leads to various advantages in points of cutting the cost, the installation space and the installation time of the lubricant supply equipment, eliminating the need of maintenance work for lubricant supply lines, reducing frictional losses of the bearings and the speed reducer which are supplied with the lubricant, and preventing a drop of the availability factor caused by troubles in the lubricant supply lines.

DESCRIPTION OF THE PREFERRED EMBODIMENTS

A first embodiment of the present invention will be described below with reference to the drawings.

Note that, while the following embodiments of the present invention will be described, by way of example, in connection with a power generation facility using a gas turbine, the technical concept of the present invention is also applicable to another type of power generation facility in which a steam turbine, a diesel engine or the like is used as a prime mover and a driving rotor of such a prime mover is connected to a generator rotor for generation of electric power. Further, the present invention is not limited to the case of driving the power generator by the prime mover, but it can be also applied to the case where a pump, a gas compressor, etc. is used as load equipment driven by the prime mover. While the gas turbine is described in each of the following embodiments as a single-shaft gas turbine in which a turbine rotor is not divided, the present invention is similarly applicable to the case of using the so-called dual-shaft gas turbine which includes a high-pressure turbine rotor for driving a compressor and a low-pressure turbine rotor for driving the load equipment.

Figure 1:
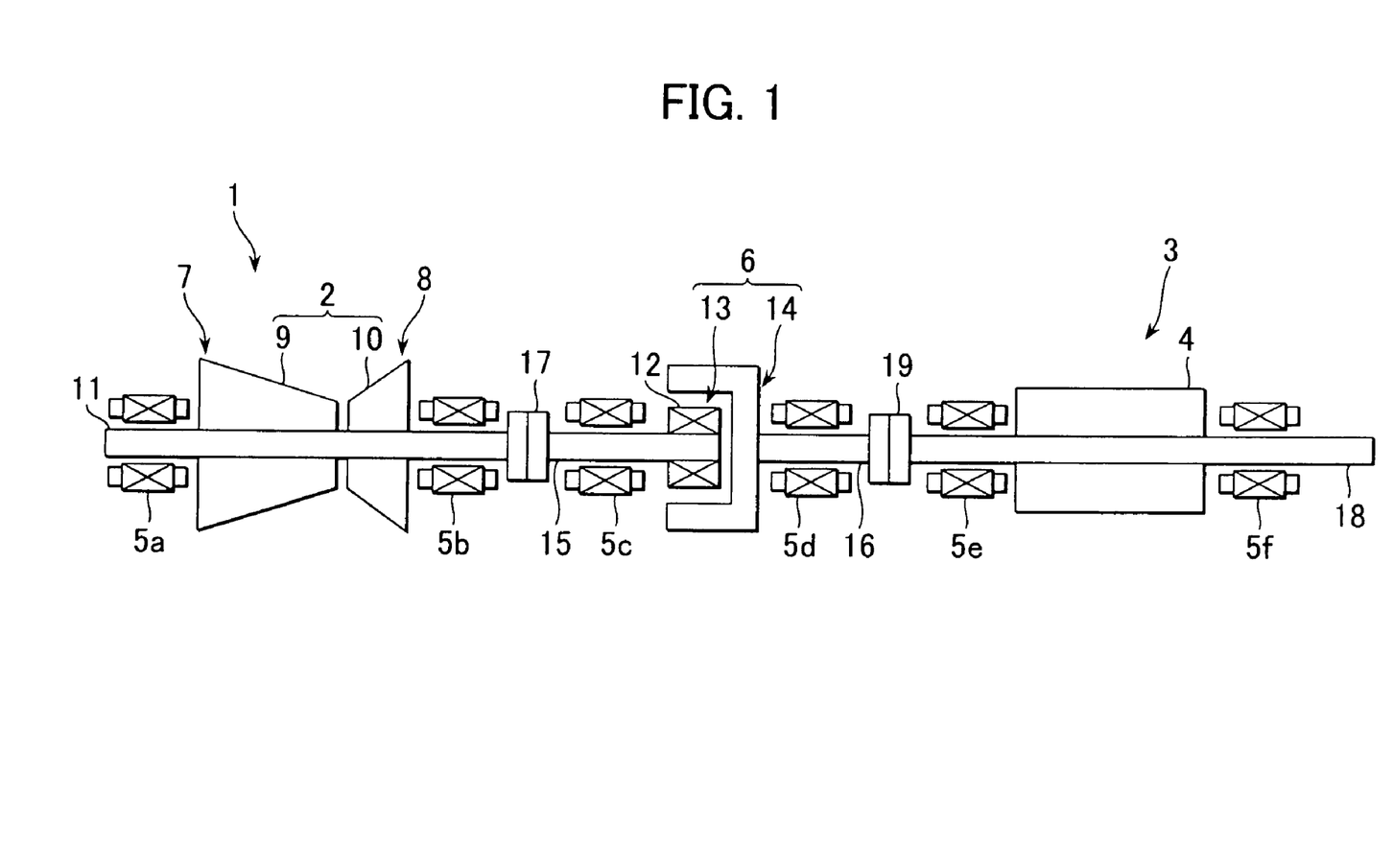
FIG. 1 is a schematic view showing the overall construction of a plant facility according to a first embodiment of the present invention.

FIG. 1 is a schematic view showing the overall construction of a plant facility according to a first embodiment of the present invention.

The plant facility of this embodiment comprises a gas turbine rotor (driving rotor) 2 provided in a gas turbine 1 that serves as a prime mover rotated by expansion work of a working fluid, a generator rotor (load equipment rotor) 4 of a power generator 3 that serves as load equipment rotated by rotational power transmitted from the gas turbine rotor 2, a plurality of magnetic bearings 5a-5f for supporting the gas turbine rotor 2 and the generator rotor 4, and an electromagnetic coupling (e.g., an eddy current coupling) 6 for magnetically coupling the gas turbine rotor 2 and the generator rotor 4 and adjusting a speed reduction ratio between the gas turbine rotor 2 and the generator rotor 4 in accordance with supplied power.

The gas turbine 1 comprises a compressor 7, a turbine 8, and a combustor (not shown). Compressed air from the compressor 7 is burnt in the combustor together with fuel, and combustion exhaust gas is introduced to the turbine 8 so that the turbine 8 produces rotational power with expansion work of the exhaust gas. The gas turbine rotor 2 is of the single shaft type that a compressor rotor 9 of the compressor 7 and a driving rotor of the turbine 8, i.e., a turbine rotor 10, are coupled to each other by the same shaft. A rotary shaft 11 of the compressor rotor 9 and the turbine rotor 10 both rotating together is rotatably supported at its opposite ends by the magnetic bearings 5a and 5b. Note that supporting points by the magnetic bearings are not limited to the opposite ends of the rotary shaft 11, and the rotary shaft 11 may be supported at other points. Further, the rotary shaft 11 may be supported by the magnetic bearings at three or more points instead of the two points.

The electromagnetic coupling 6 comprises a coupling member 13 on one side around which a solenoid coil 12 is wound, and a coupling member 14 on the other side which is positioned in opposed relation to the coupling member 13. Rotary shafts 15 and 16 of the coupling members 13 and 14 are rotatably supported by the magnetic bearings 5c and 5d, respectively. Supporting points of the electromagnetic coupling 6 by the magnetic bearings are also not limited to the illustrated points and may be optionally set to other suitable points. Further, each coupling member may be supported by the magnetic bearings at two or more points.

A power supply (not shown) is connected to the solenoid coil 12 wound over the coupling member 13 on one side, and a magnetic field is generated upon supply of power (current) to the solenoid coil 12. With an action of the generated magnetic field, the coupling member 13 on one side and the coupling member 14 on the other side are magnetically coupled to each other in a non-contact state, whereby rotation of the coupling member 13 on one side is transmitted to the coupling member 14 on the other side. The intensity of the magnetic field formed around the coupling member 13 on one side depends on the amount of power (current) supplied to the solenoid coil 12, and the transmission efficiency of rotational power between the coupling members 13 and 14 is increased in proportion to the amount of current supplied to the solenoid coil 12.

The rotary shaft 15 of the coupling member 13 on one side and the rotary shaft 11 of the gas turbine rotor 2 are coupled through a coupling 17 to be rotated together. Also, the rotary shaft 16 of the coupling member 14 on the other side and a rotary shaft 18 of the generator rotor 4 are coupled through a coupling 19 to be rotated together. The rotary shaft 18 of the generator rotor 4 is rotatably supported at its opposite ends by the magnetic bearings 5e and 5f. For the generator rotor 4, too, supporting points by the magnetic bearings are not limited to the opposite ends of the rotary shaft 18, and the rotary shaft 18 may be supported at other points. Further, the rotary shaft 18 may be supported by the magnetic bearings at three or more points instead of the two points.

With the construction described above, the rotational power of the gas turbine rotor 2 is transmitted to the generator rotor 4 through the electromagnetic coupling 6, and the power generator 3 generates electric power.

Figure 2:
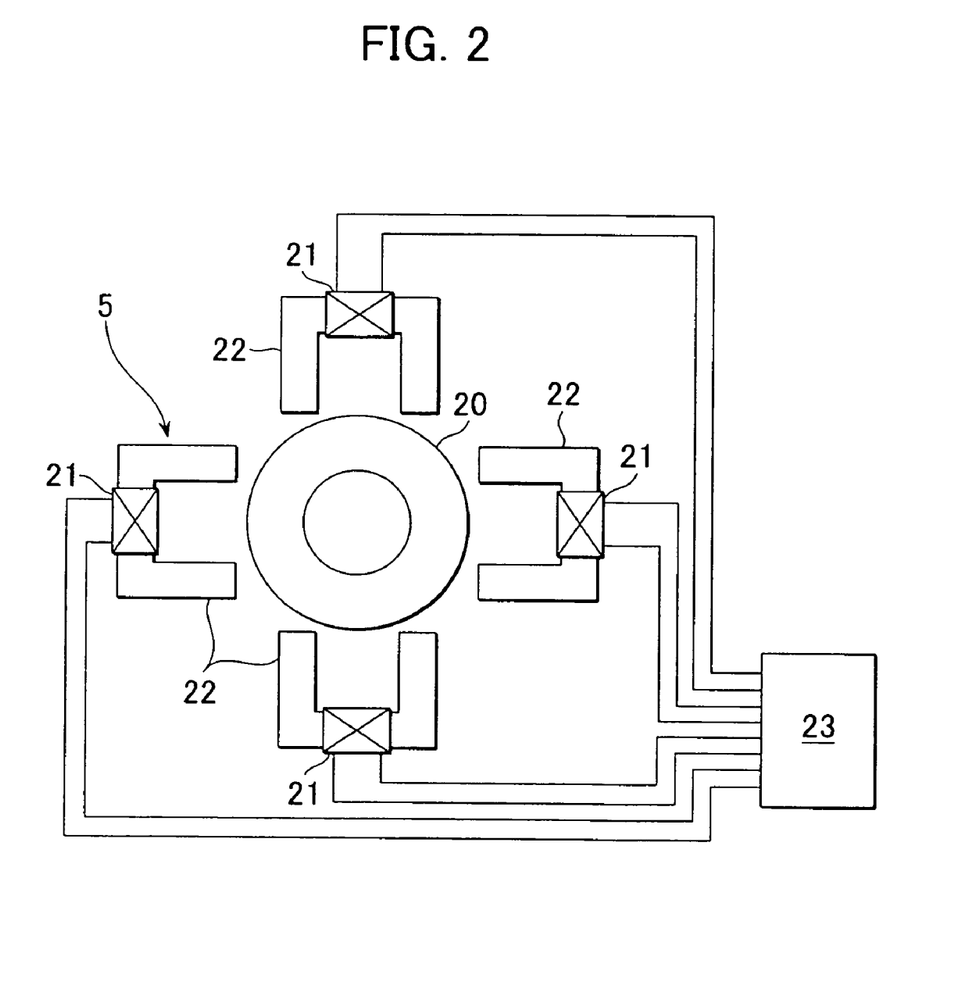
FIG. 2 is a schematic view showing the construction of a magnetic bearing.

FIG. 2 is a schematic view showing the construction of each of the magnetic bearings 5a-5f.

Note that the magnetic bearings 5a-5f have the same construction and the construction of a magnetic bearing 5, shown in FIG. 2, is common to all the magnetic bearings 5a-5f. Also, a rotary shaft 20 shown in FIG. 2 corresponds to one of the rotary shafts 11, 15, 16 and 18 shown in FIG. 1.

In FIG. 2, the magnetic bearing 5 includes a plurality (four in FIG. 2) of electromagnets 22 arranged in surrounding relation to the rotary shaft 20. A solenoid coil 21 connected to a power supply 23 is wound over each of the electromagnets 22. When current is supplied to the solenoid coil 21, a magnetic field is formed around the electromagnet 22 so that a magnetic attraction force or repulsive force acts between the rotary shaft 20 and the electromagnet 22. Therefore, the rotary shaft 20 is floated and supported in a rotatable state. The magnetic bearing 5 includes, though not shown, a gap sensor for detecting a gap between the rotary shaft 20 and the electromagnet 22, and change of the gap detected by the gap sensor is outputted to a control unit. In accordance with a detected signal from the gap sensor, the control unit controls the amount of current supplied from the power supply 23 to the solenoid coil 21 to control the magnetic attraction force or repulsive force so that the position of center of rotation of the rotary shaft 20 in the floated state is adjusted to a proper position.

Figure 3:
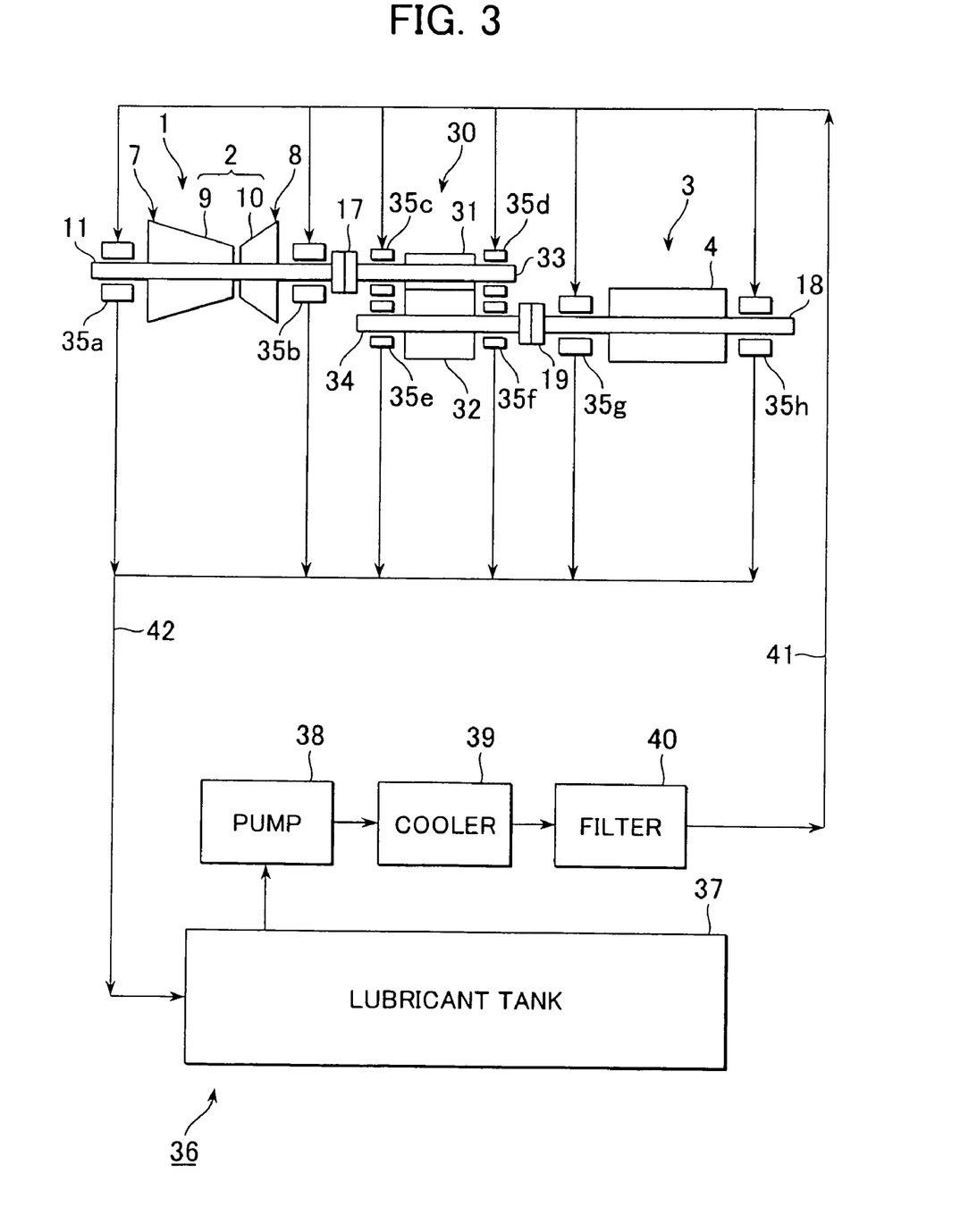
FIG. 3 is a schematic view showing the overall construction of a known gas-turbine power generation facility as a comparative example for the purpose of comparison with the plant facility of the first embodiment.

FIG. 3 schematically shows the overall construction of a known gas-turbine power generation facility as a comparative example for the purpose of comparison with the plant facility of the first embodiment. Components in FIG. 3 corresponding to those in FIG. 1 are denoted by the same reference numerals, and a description of those components is omitted here.

The known gas-turbine power generation facility shown in FIG. 3 comprises a gas turbine 1, a power generator 3, and a speed reducer 30 for connecting the gas turbine 1 and the power generator 3. The speed reducer 30 includes gears 31, 32 having different sizes and numbers of teeth and meshing with each other. A rotary shaft 33 of the gear 31 is coupled to a rotary shaft 11 of a compressor rotor 9 and a turbine rotor 10 through a coupling 17, and a rotary shaft 34 of the gear 32 is coupled to a rotary shaft 18 of a generator rotor 4 through a coupling 19. The rotary shafts 11, 33, 34 and 18 are supported by slide bearings 35a-35h.

In such a facility using the slide bearings 35a-35h, lubricant supply equipment 36 is required for supplying a lubricant to the slide bearings 35a-35h. The lubricant supply equipment 36 comprises a lubricant tank 37 for storing the lubricant, a pump 38 for delivering the lubricant from the lubricant tank 37, a cooler 39 for cooling the lubricant, a filter 40 for removing foreign matters from the lubricant, a lubricant feed line 41 for supplying the lubricant to the slide bearings 35a-35h through it, a lubricant discharge line 42 for discharging the lubricant from the slide bearings 35a-35h through it, and so on.

Thus, the gas-turbine power generation facility of the known structure requires the lubricant supply equipment 36 because the lubricant has to be supplied to the slide bearings 35a-35h. Installation of the lubricant supply equipment 36 entails the necessity of not only providing many auxiliaries mentioned above, such as the lubricant tank 37, the lubricant pump 38, the lubricant cooler 39 and the lubricant filter 40, but also routing the lubricant feed line 41 and the lubricant discharge line 42 in complicated layout. As a result, the equipment cost is increased and, in addition, so is the number of working steps required for installing the equipment. Also, although the lubricant is supplied to the slide bearings 35a-35h, some frictional loss is inevitably caused between each rotary shaft and a lubricant film, and bearing losses are relatively large. It is hence difficult to obtain the power generation efficiency at a sufficient level. Additionally, the lubricant has to be further supplied to tooth surfaces of the gears 31, 32 of the gear type speed reducer 30.

In contrast, according to this embodiment, as described above, all the rotors of the plant facility, including the coupling members 13 and 14 of the electromagnetic coupling 6, are supported by the magnetic bearings, and the transmission efficiency of the rotational power between the gas turbine rotor 2 and the generator rotor 4 is adjusted in accordance with the amount of current supplied to the electromagnetic coupling 6. Therefore, the necessity of providing the lubricant supply equipment for supplying the lubricant to the rotor bearings and the speed reducer is eliminated, thus resulting in a substantial reduction of the equipment cost and the working cost required for installing the equipment. No necessity of the lubricant supply equipment further prevents a drop of the availability factor caused by troubles in the lubricant supply lines. Still another advantage is that maintenance work for the lubricant supply lines is also no longer required.

Moreover, according to this embodiment, because of using the magnetic bearings that hardly cause frictional losses between those bearings and the rotating components, it is possible to suppress the bearing losses very small and to increase the power generation efficiency.

Further, this embodiment includes the electromagnetic coupling 6 for transmitting the rotational power from the gas turbine rotor 2 to the generator rotor 4 while changing a rotational speed. If the gas turbine rotor 2 and the generator rotor 4 are rotated at the same rotational speed, the rotary shafts 11 and 18 of the gas turbine rotor 2 and the generator rotor 4 can be directly coupled to each other. However, the rotational speed of the gas turbine rotor 2 is generally larger than that of the generator rotor 4. For that reason, a speed reducer is required which transmits the rotational power from the gas turbine rotor 2 to the generator rotor 4 while reducing the rotational speed.

Figure 4:
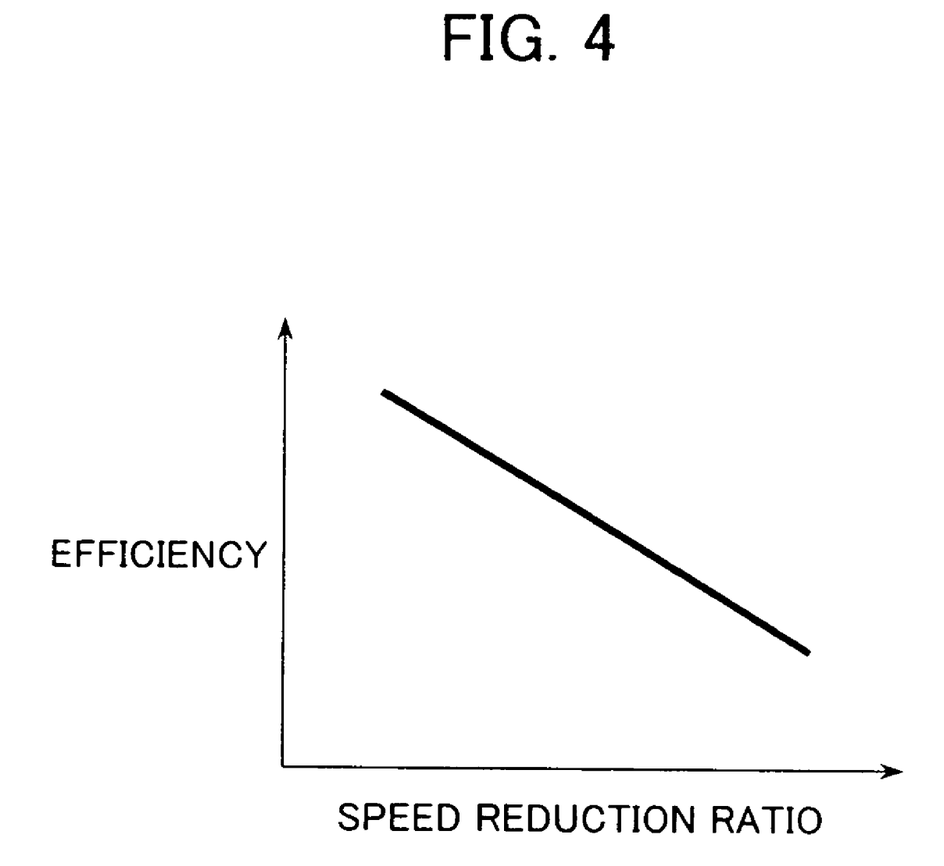
FIG. 4 is a graph representing the relationship between a speed reduction ratio and efficiency in a fluid coupling.

The known gas-turbine power generation facility shown in FIG. 3 uses a gear type speed reducer having a plurality of gears meshed with each other. In the gear type speed reducer, however, a speed reduction ratio is uniquely decided depending on the number of teeth of each of the used gears, and the speed reduction ratio cannot be freely changed. As another example of the speed reducer, there is also known a fluid coupling other than the gear type speed reducer. The fluid coupling comprises, for example, a pump impeller joined to a rotary shaft of a gas turbine and a turbine impeller joined to a rotary shaft of load equipment, such as a power generator, both the impellers being disposed in opposite relation. A fluid (e.g., oil or a lubricant) is introduced to a casing in which the pump impeller and the turbine impeller are disposed. When the pump impeller is rotated with rotation of the gas turbine, rotational power is transmitted to the turbine impeller through the fluid given with rotational energy so that the load equipment is driven. In that fluid coupling, the speed reduction ratio can be adjusted in accordance with the amount of the fluid in the casing. Even with the use of the fluid coupling, however, lubricant supply equipment is required because a large amount of oil is employed. Furthermore, in the fluid coupling, the power transmission efficiency tends to reduce as the speed reduction ratio increases (see FIG. 4).

In contrast, according to this embodiment, the rotational power of the rotary shaft 11 of the gas turbine 1 is transmitted to the rotary shaft 18 of the power generator 3 through the electromagnetic coupling 6. In the electromagnetic coupling 6, the solenoid coil 12 generating a magnetic field upon application of a DC current is wound over the coupling member 13 on one side, and the coupling member 14 on the other side is coupled to the generated magnetic field, whereby torque is transmitted with an eddy current produced depending on a relative difference in rotational speed between the two coupling members 13 and 14. Accordingly, the speed reduction ratio can be freely changed by adjusting the amount of current supplied to the solenoid coil 12 and controlling the intensity of the generated magnetic field. Further, as mentioned above, neither the supply of the lubricant nor the lubricant supply equipment is required any more.

However, a non-contact electromagnetic coupling, including such an eddy-current coupling, has such a tendency that, like the fluid coupling, the torque transmission efficiency is reduced as the speed reduction ratio increases. For that reason, the electromagnetic coupling has not hitherto been used in various plant facilities, represented by the gas-turbine power generation facility, from the viewpoint of efficiency.

According to this embodiment, since the bearings supporting the rotating components are all constituted as the magnetic bearings, the bearing losses are drastically reduced so as to compensate for a reduction of the torque transmission efficiency during the operation in which the speed reduction ratio is comparatively large. As a result, it is possible to realize a plant facility which can be satisfactorily used in practice from the viewpoint of efficiency as well.

If the power generator is short-circuited, excessively large torque is transmitted from the power generator to the turbine side. In the case of using the gear type speed reducer as in the past, there has been a risk that the excessive torque acts on gear meshing portions and gears are damaged due to an action of excessively large forces. The case of using the gear type speed reducer has also accompanied with a risk that the excessively large torque generated upon short-circuiting of the power generator is mechanically transmitted to the turbine and the turbine is damaged due to an action of excessively large forces.

Those problems can also be avoided in this embodiment. More specifically, the generator rotor 4 and the gas turbine rotor 2 are connected to each other in a non-contact manner by the electromagnetic coupling 6. Therefore, even if the power generator 3 is short-circuited and excessively large torque is generated, the excessively large torque is cut off at the electromagnetic coupling 6. As a result, the electromagnetic coupling 6 and the gas turbine 1 are prevented from being damaged by the excessively large torque, and high reliability of the power generation facility can be ensured from that point of view as well.

A second embodiment of the present invention will be described below.

In the second embodiment, a gas turbine and a steam turbine both serving as prime movers are installed one on each of opposite sides of a power generator serving as load equipment such that the power generator is driven by either the gas turbine or the steam turbine. While this embodiment is described, by way of example, in connection with the case where the power generator 3 is arranged between the gas turbine and the steam turbine, the power generator may be arranged between two gas turbines and driven by one of the two gas turbines, or the power generator may be arranged between two steam turbines and driven by one of the two steam turbines. As a matter of course, an engine, e.g., a diesel engine, may be used as one (or both) of the two prime movers. In addition, the load equipment is not limited to the power generator and may be replaced with a pump, a gas compressor, etc.

Figure 5:
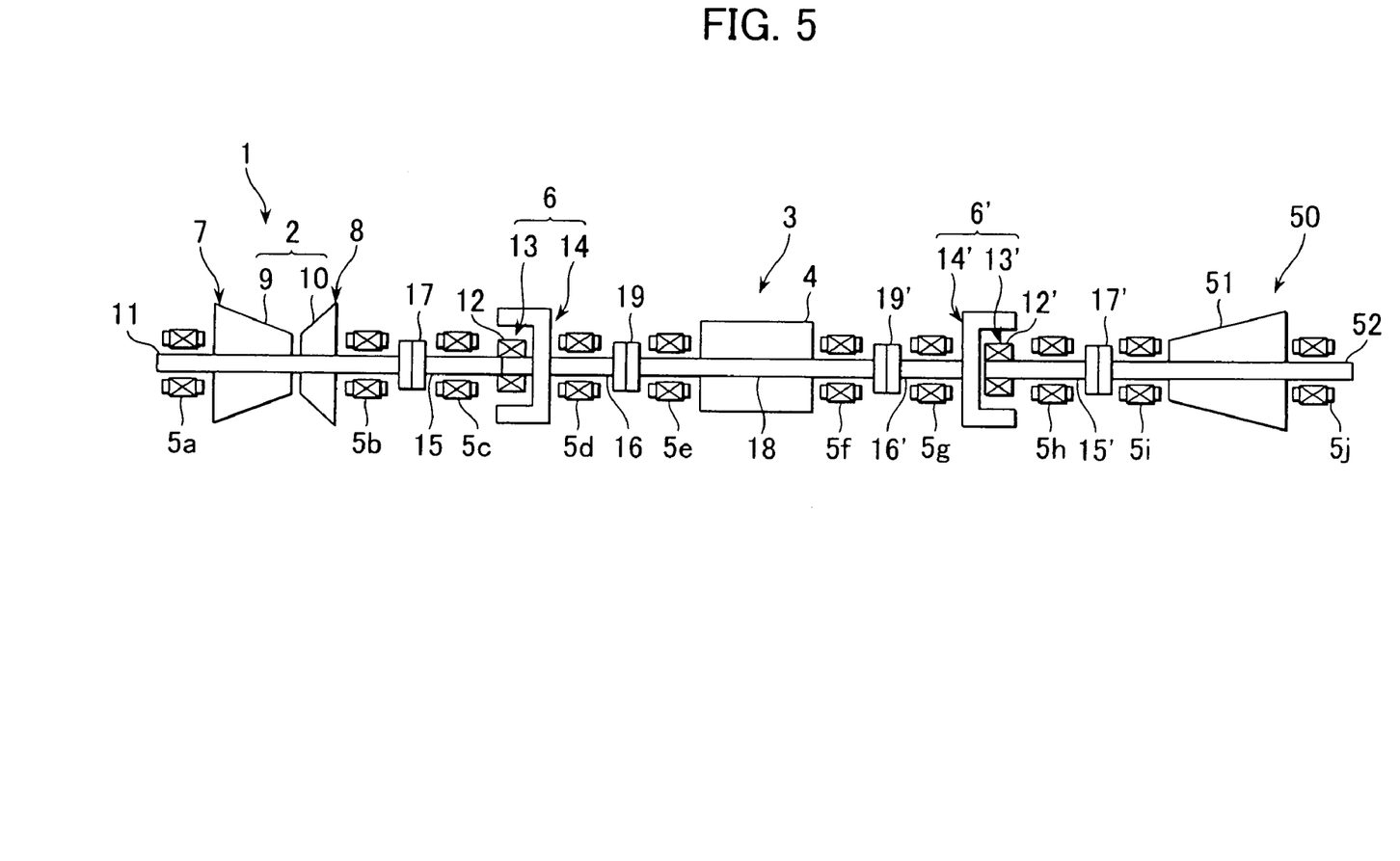
FIG. 5 is a schematic view showing the overall construction of a plant facility according to a second embodiment of the present invention.

FIG. 5 is a schematic view showing the overall construction of a plant facility according to a second embodiment of the present invention. Similar components in FIG. 5 to those in the foregoing drawings are denoted by the same reference numerals, and a description of those components is omitted here.

In FIG. 5, the plant facility of this embodiment comprises driving rotors 2 and 51 provided respectively in a gas turbine 1 and a steam turbine 50 that serve as a plurality of prime movers, a generator rotor (load equipment rotor) 4 of a power generator 3 that serves as load equipment positioned between the plurality of driving rotors 2 and 51 and rotated by rotational power transmitted from at least one of the driving rotors 2 and 51 positioned on both the sides of the generator rotor 4, a plurality of magnetic bearings 5a-5j for supporting the driving rotors 2 and 51 and the generator rotor 4, and electromagnetic couplings 6 and 6' for magnetically coupling the plurality of driving rotors 2 and 51 to the generator rotor 4 and adjusting speed reduction ratios between the driving rotors 2 and 51 and the generator rotor 4 in accordance with supplied power.

The steam turbine 50 is supplied with steam from, e.g., a boiler (not shown) and produces rotational power with expansion work of the steam. A rotary shaft 52 of the driving rotor (steam turbine rotor) 51 is rotatably supported at its opposite ends by the magnetic bearings 5i and 5j. Note that supporting points by the magnetic bearings are not limited to the opposite ends of the rotary shaft 52, and the rotary shaft 52 may be supported at other points. Further, the rotary shaft 52 may be supported by the magnetic bearings at three or more points instead of the two points.

The electromagnetic coupling 6' has the same structure as the electromagnetic coupling 6 and comprises a coupling member 13' on one side around which a solenoid coil 12' is wound, and a coupling member 14' on the other side which is positioned in opposed relation to the coupling member 13'. Rotary shafts 15' and 16' of the coupling members 13' and 14' are rotatably supported by the magnetic bearings 5h and 5g, respectively. Supporting points of the electromagnetic coupling 6' by the magnetic bearings are also not limited to the illustrated points and may be optionally set to other suitable points. Further, each coupling member may be supported by the magnetic bearings at two or more points.

A power supply (not shown) is connected to the solenoid coil 12' wound over the coupling member 13' on one side, and a magnetic field is generated upon supply of current to the solenoid coil 12'. With an action of the generated magnetic field, the coupling member 13' on one side and the coupling member 14' on the other side are magnetically coupled to each other, whereby rotation of the coupling member 13' on one side is transmitted to the coupling member 14' on the other side in a non-contact state. The intensity of the magnetic field formed around the coupling member 13' on one side depends on the amount of current supplied to the solenoid coil 12', and the transmission efficiency of rotational power between the coupling members 13' and 14' is increased in proportion to the amount of current supplied to the solenoid coil 12'.

The rotary shaft 15' of the coupling member 13' on one side and the rotary shaft 52 of the steam turbine rotor 51 are coupled through a coupling 17' to be rotated together. Also, the rotary shaft 16' of the coupling member 14' on the other side and a rotary shaft 18 of the generator rotor 4 are coupled through a coupling 19' to be rotated together.

With the construction described above, the rotational power of at least one of the gas turbine rotor 2 and the steam turbine rotor 51 is transmitted to the generator rotor 4 through at least one of the electromagnetic couplings 6 and 6', and the power generator 3 generates electric power. The remaining construction is the same as that in the first embodiment. Thus, with the construction of supporting all rotating components by the magnetic bearings and connecting the rotating components to each other through the electromagnetic coupling, this second embodiment can also provide similar advantages to those obtained with the first embodiment.

Figure 6:
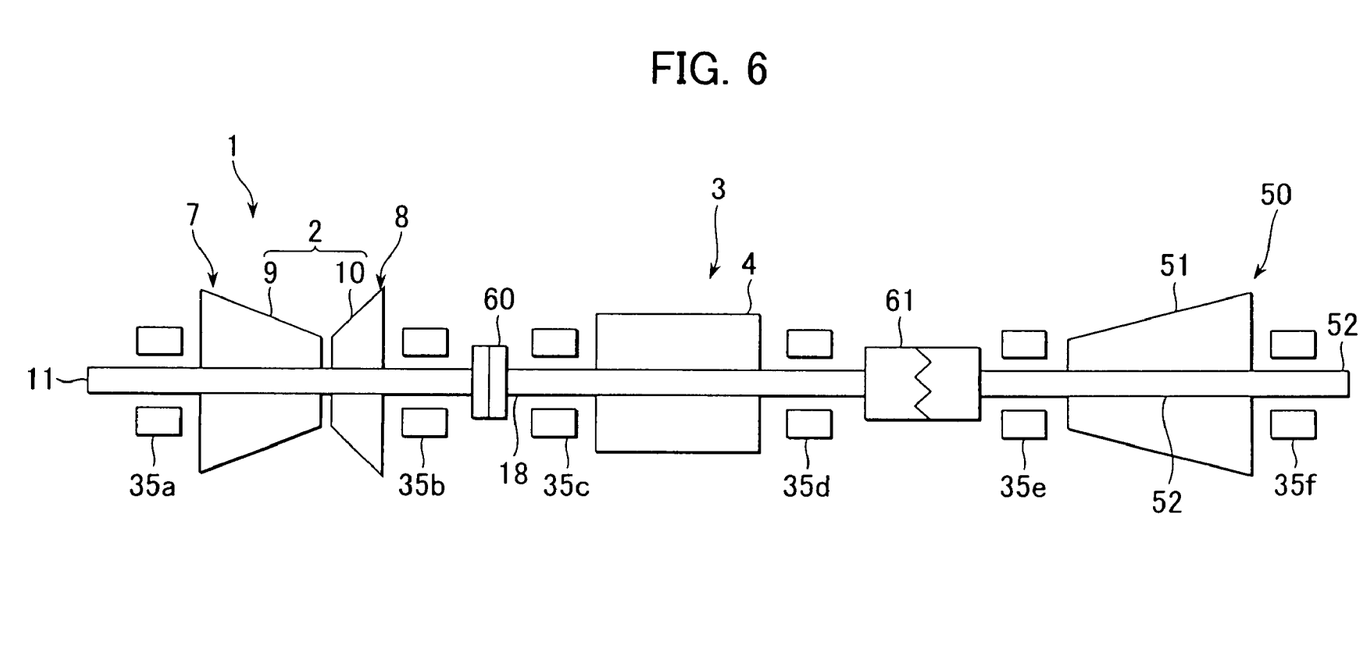
FIG. 6 is a schematic view showing the overall construction of a known power generation facility with single-shaft combined cycle as a comparative example for the purpose of comparison with the plant facility of the second embodiment.

FIG. 6 schematically shows the overall construction of a known power generation facility with single-shaft combined cycle as a comparative example for the purpose of comparison with the plant facility of the second embodiment. Similar components in FIG. 6 to those in FIG. 5 are denoted by the same reference numerals, and a description of those components is omitted here.

The power generation facility shown in FIG. 6 comprises a gas turbine 1, a steam turbine 50, and a power generator 3 installed between the gas turbine 1 and the steam turbine 50. A rotary shaft 11 of the gas turbine 1 and a rotary shaft 18 of a generator rotor 4 are coupled to each other through a coupling 60. The rotary shaft 18 of the generator rotor 4 and a rotary shaft 52 of the steam turbine 50 are coupled to each other through a clutch 61. With engagement of the clutch 61, the rotary shaft 18 of the power generator 3 and the rotary shaft 52 of the steam turbine 50 are coupled to each other so that rotational power is transmitted between the rotary shafts 18 and 52. With disengagement of the clutch 61, the transmission of the rotational power between the rotary shafts 18 and 52 is cut off. The clutch 61 has the so-called helical spline fitting structure. The rotary shafts 11, 18 and 52 are supported by slide bearings 35a-35f.

In the known power generation facility with single-shaft combined cycle which is constructed as shown in FIG. 6, when the gas turbine 1 is started up to rotate the generator rotor 4 and a difference in rotational speed between the generator rotor 4 and the steam turbine rotor 51 is reduced beyond a predetermined threshold, the clutch 61 is engaged, whereby the steam turbine rotor 51 is coupled to the generator rotor 4. Stated another way, the rotational power is first given to the generator rotor 4 from the gas turbine 1, and the rotational power of the steam turbine 50 is then added to the generator rotor 4. When the power generation facility is shut down, the shutdown can be performed through procedures reversal to the startup ones described above. Thus, in the known power generation facility with single-shaft combined cycle, if the gas turbine cannot be operated due to maintenance, failure or other reasons, it is generally impossible to perform the power generation by coupling only the steam turbine to the power generator.

In contrast, according to the power generation facility with single-shaft combined cycle of this embodiment shown in FIG. 5, the power generation can be performed by driving the power generator 3 with either one of the gas turbine 1 and the steam turbine 50. Stated another way, the power generator 3 can be of course driven by only the gas turbine 1 with the gas turbine rotor 2 and the generator rotor 4 coupled through the electromagnetic coupling 6, while the power generator 3 can also be driven by only the steam turbine 50 with the steam turbine rotor 51 and the generator rotor 4 coupled through the electromagnetic coupling 6'. Accordingly, even if the gas turbine 1 (or the steam turbine 50) cannot be operated due to maintenance, failure or other reasons, it is possible to perform the power generation by coupling only the steam turbine 50 (or the gas turbine 1) to the power generator 3. Furthermore, the rotational powers of both the gas turbine 1 and the steam turbine 50 can also be transmitted to the generator rotor 4 at the same time by controlling the currents supplied to the electromagnetic couplings 6 and 6' at the same time.

In addition, the electromagnetic couplings 6 and 6' are each able to not only engage and disengage the rotary shafts, but also change the rotational speed between the rotary shafts. Accordingly, when the rotational speed of the generator rotor differs from that of the driving rotor, the known construction shown in FIG. 6 requires a transmission and a clutch to be installed between the two rotors, whereas this embodiment requires only the electromagnetic coupling, thus resulting in a great merit. Also, the clutch 61 shown in FIG. 6 has the so-called helical spline fitting structure and hence requires a lubricant to be supplied to fitting portions, whereas this embodiment requires neither supply of the lubricant nor the lubricant supply equipment.

In general, a separate starter unit is required to start up a turbine. However, by employing, as the power generator 3, a thyristor power generator which can serve not only as the power generator 3 having the generator rotor 4, but also as a motor, it is possible to omit the starter unit or reduce the number of necessary starter units. When such a thyristor power generator is employed in this embodiment, the facility is started up, for example, by a method of first driving the power generator 3 to start up the turbine 1 with the electromagnetic coupling 6 engaged. Then, when the rotational speed of the gas turbine 1 reaches a predetermined value, the electromagnetic coupling 6' is engaged so that the rotational power of the steam turbine 50 is transmitted to the power generator 3. As a matter of course, the startup method can also be performed through procedures reversal to the above-described ones.

What is claimed is:

1. A plant facility comprising:
   a gas turbine for generating rotational power;
   load equipment driven by the rotational power of said gas turbine;
   a plurality of magnetic bearings for supporting a driving rotor of said gas turbine and a load equipment rotor of said load equipment; and
   an electromagnetic coupling for magnetically coupling said driving rotor and said load equipment rotor and adjusting a speed reduction ratio between said driving rotor and said load equipment rotor in accordance with supplied power.

2. The plant facility according to claim 1, wherein said load equipment is a power generator.

3. The plant facility according to claim 2, wherein said load equipment is capable of being used also as a motor.

4. A plant facility comprising:
   a plurality of prime movers each generating rotational power, each of said plurality of prime movers being a gas turbine or a steam turbine, respectively;
   load equipment installed between said plurality of prime movers and driven by the rotational power of at least one of said prime movers;
   a plurality of magnetic bearings for supporting respective driving rotors of said plurality of prime movers and a load equipment rotor or said load equipment; and
   a plurality of electromagnetic couplings for magnetically coupling said respective driving rotors and said load equipment rotor, each of said electromagnetic couplings adjusting a speed reduction ratio between a corresponding one of said driving rotors and said load equipment rotor in accordance with supplied power and engaging and disengaging between a corresponding one of said driving rotors and said load equipment rotor.

* * * * *